United States Patent [19]

Chen et al.

[11] Patent Number: 5,299,317

[45] Date of Patent: Mar. 29, 1994

[54] METHOD AND APPARATUS FOR SIMULATING AN INTERCONNECTION NETWORK

[75] Inventors: Chien-Yi R. Chen; Jyan-Ann C. Hsia, both of Syracuse, N.Y.

[73] Assignee: Syracuse University, Syracuse, N.Y.

[21] Appl. No.: 956,444

[22] Filed: Oct. 2, 1992

Related U.S. Application Data

[63] Continuation of Ser. No. 414,852, Sep. 29, 1989, abandoned.

[51] Int. Cl.⁵ ............................................ H04Q 11/00
[52] U.S. Cl. ................................. 395/325; 364/919; 364/929.1; 364/933.8; 364/940.61; 364/DIG. 2; 395/800
[58] Field of Search ................... 395/200, 325, 800; 370/58, 60; 364/200, 900

[56] References Cited

U.S. PATENT DOCUMENTS

| | | | |
|---|---|---|---|
| 4,523,273 | 6/1985 | Adams, III et al. | 364/200 |
| 4,785,446 | 11/1988 | Dias et al. | 370/58 |
| 4,965,788 | 10/1990 | Newman | 370/60 |
| 4,968,977 | 11/1990 | Chinnaswamy et al. | 340/825.8 |

OTHER PUBLICATIONS

D. C. Opferman and N. T. Tsao-Wu, "On a Class of Rearrangeable Switching Networks", Part I and Part II, Bell Syst. Tech J., vol. 50, pp. 1579-1618, May-Jun. 1971.

C. Wu and T. Y. Feng, "On a Class of Multistage Interconnection Networks", IEEE Trans. on Computers, vol. C-29, pp. 694-702, Aug. 1980.

P. Yew and D. H. Lawrie, "An Easily Controlled Network for Frequently Used Permutations", IEEE Trans. on Computers, vol. C-30, No. 4, 1981.

G. B. Adams, III, and H. J. Siegal, "The Extra Stage Cube: A Fault-Tolerant Interconnection Network for Supersystems", IEEE Trans. on Computers, vol. C-31, pp. 443-454, May 1982.

C. P. Kruskal and M. Snir, "A Unified Theory of Interconnection Network Structure", Th. Comp. Sci., vol. 48, No. 1, pp. 75-94, 1986.

C. Clos, "A Study of Non-Blocking Switching Networks", Bell Syst. Tech. J., vol. 32, pp. 406-428, Mar. 1953.

V. E. Benes, "Permutation Groups, Complexes, and Rearrangeable Connecting Networks", Bell Syst. Tech. J., vol. 43, pp. 1619-1640, Jul. 1964.

A. Waksman, "A Permutation Network", J. ACM, vol. 15, pp. 159-163, Jan. 1968.

L. R. Goke and G. J. Lipowski, "Banyan Networks for Partitioning Multiprocessor Systems", 1st Annual Symposium on Computer Architecture, pp. 21-28, 1973.

T. Y. Feng, "Data Manipulating Functions in Parallel Processors and Their Implementations", IEEE Trans. Comput., vol. C-23, pp. 309-318, Mar. 1974.

B. E. Benes, "Proving the Rearrangeability of Connecting Networks by Group Calculations", Bell Syst. Tech. J., vol. 54, pp. 421-434, Feb. 1975.

(List continued on next page.)

Primary Examiner—Gareth D. Shaw
Assistant Examiner—Dennis M. Butler
Attorney, Agent, or Firm—Pennie & Edmonds

[57] ABSTRACT

A method and apparatus are described for simulating on one multi-stage interconnection network (MIN) the operation of a second MIN. By means of two algorithms we generate first and second vectors, $I_1$, $O_1$, which characterize the first MIN and by means of the same two algorithms we generate third and fourth vectors, $I_2O_2$, which characterize the second MIN. We then generate fifth and sixth vectors, U, V, where $U = O_2 * O_1^{-1}$ and $V = I_1^{-1} * I_2$ where $O_1^{-1}$ and $I_1^{-1}$ are the inverses, respectively, of $O_1$ and $I_1$ and * is a two-operand permutation operation which permutes elements of a first operand (e.g., $O_2$) in accordance with an order specified by a second operand (e.g., $O_1^{-1}$). The fifth vector is then used to reorder the inputs to the first MIN; and the sixth vector is used to reorder the outputs from said first MIN. As a result, inputs to the first MIN are mapped to outputs from said first MIN in accordance with the interconnection pattern of said second MIN.

10 Claims, 16 Drawing Sheets

OTHER PUBLICATIONS

D. Lawrie, "Access and Alignment of Data in an Array Processor", IEEE Trans. Comput., vol. C-24, pp. 1145-1155, Dec. 1975.

K. E. Batcher, "The Flip Network in Staran", Proc. Int. Conf. Parallel Processing, pp. 65-71, Aug. 1976.

M. C. Pease, "The Indirect Binary n-Cube Microprocessor Array", IEEE Trans. Comput., vol. C-26, pp. 458-473, May 1977.

H. J. Siegel and D. S. Smith, "Study of Multistage SIMD Interconnection Networks", Proc. 5th Annu. Symp. Comput. Arch., New York, NY pp. 223-229, Apr. 1978.

H. J. Siegel, "Interconnection Networks for SIMD Machines", IEEE Computer, vol. 12, pp. 57-65, Jun. 1979.

D. S. Parker, "Notes on Shuffle/Exchange-Type Switching Networks", IEEE Trans. Comput., vol. C-29, pp. 213-221, Mar. 1980.

P. Yew and D. H. Lawrie, "An Easily Controlled Network for Frequently Used Permutations", IEEE Trans. Comput., vol. C-30 No. 4, 1981.

G. P. Lev, N. Pippenger and L. G. Valiant, "A Fast Parallel Algorithm for Routing in Permutation Networks", IEEE Trans. Comput., vol. C-30, pp. 93-100, Feb. 1981.

J. H. Patel, "Performance of Processor-Memory Interconnections for Multiprocessors", IEEE Trans. Comput., vol. C-30, pp. 771-780, Oct. 1981.

T. Y. Feng, "a Survey of Interconnection Networks", IEEE Computer, vol. 14, No. 12, pp. 12-27, Dec. 1981.

H. J. Siegel and R. J. McMillen, "The Multistage Cube: A Versatile Interconnection Network", IEEE Computer, vol. 14, pp. 65-76, Dec. 1981.

U. V. Premkumer and J. C. Browne, "Resource Allocation in Rectangular SW Banyans", 9th Annual Symposium on Computer Architecture, pp. 326-333, 1982.

G. B. Adams, III, and H. J. Siegel, "The Extra Stage Cube: A Fault-Tolerant Interconnection Network for Supersystems", IEEE Trans. Comput., vol. C-31, pp. 443-454, May 1982.

D. P. Agrawal, "Graph Theoretical Analysis and Design of Multistage Interconnection Networks", IEEE Trans. Comput., vol. C-32, pp. 637-648, Jul. 1983.

H. J. Siegel, "Interconnection Networks for Large-Scale Parallel Processing", Lexington Books, pp. 113-174, 1985.

K. Y. Lee, "On the Rearrangeability of $2(\log_2 N)-1$ Stage Permutation Networks", IEEE Trans. Comput., vol. C-35, pp. 412-425, Jul. 1986.

S. T. Huang and S. K. Tripathi, "Finite State Model and Compatibility Theory. New Analysis Tools for Permutation Networks", IEEE Trans. Comput., vol. C-35, pp. 591-601, Jul. 1986.

W. Lin and C. L. Wu, "Reconfiguration Procedures for a Polymorphic and Partitionable Multiprocessor", IEEE Trans. Comput., vol. C-35, pp. 910-916, Oct. 1986.

C. P. Kruskal and M. Snir, "A Unified Theory of Interconnection Network Strcuture", Th. Comp. Sci., vol. 48, No. 1, pp. 75-94, 1986.

J. C. Bermond and J. M. Fourneau, "Independent Connections: An Easy Characterization of Baseline--Equivalent Multistage Interconnection Networks", Proc. Int. Conf. Parallel Processing, pp. 187-190, 1988.

R. Boppana and C. S. Raghavendra, "On Self Routing in Benes and Shuffle Exchange Networks", Proceedings of International Conf. on Parallel Processing, pp. 196-200, 1988.

D. P. Agrawal, S. Kim, and N. K. Swain, "Analysis and Design of Nonequivalent Multistage Interconnection Networks", IEEE Trans. Comput., vol. C-37, pp. 232-237, Feb. 1988.

FIG. 1 Delta network (Prior Art)

FIG. 2 Omega network (Prior Art)

FIG. 3 Baseline network (Prior Art)

FIG. 4 Indirect Binary Cube (Prior Art)

FIG. 5 Flip network (Prior Art)

FIG. 6 Modified Data Manipulator (Prior Art)

134

Define $D = (D_{n-1}, D_{n-2}, \ldots D_1, D_0) =$
$(d_0^{i(n-1)}, d_0^{i(n-2)}, \ldots d_0^{i(1)}, d_0^{i(0)})$.
$I = (I_{n-1}, I_{n-2}, \ldots I_1, I_0)$
is defined as follows:
$(d_0^{i(n-1)}, d_0^{i(n-2)}, \ldots d_0^{i(1)},$
$(d_0^{i(0)}) * I = (D_{n-1}, D_{n-2}, \ldots D_1, D_0) = D$

135

To determine $(I_{n-1}, I_{n-2}, \ldots I_1, I_0)$:

If $d_0^{i(n-1)}$ has been complemented, $$I_{n-1} = -i(n-1)$$

Otherwise, if $d_0^{i(n-1)}$ has not been complemented, $$I_{n-1} = i(n-1)$$

If $d_0^{i(n-2)}$ has been complemented, $$I_{n-2} = -i(n-2)$$

Otherwise, if $d_0^{i(n-2)}$ has not been complemented, $$I_{n-2} = i(n-2)$$

FIG. 10b

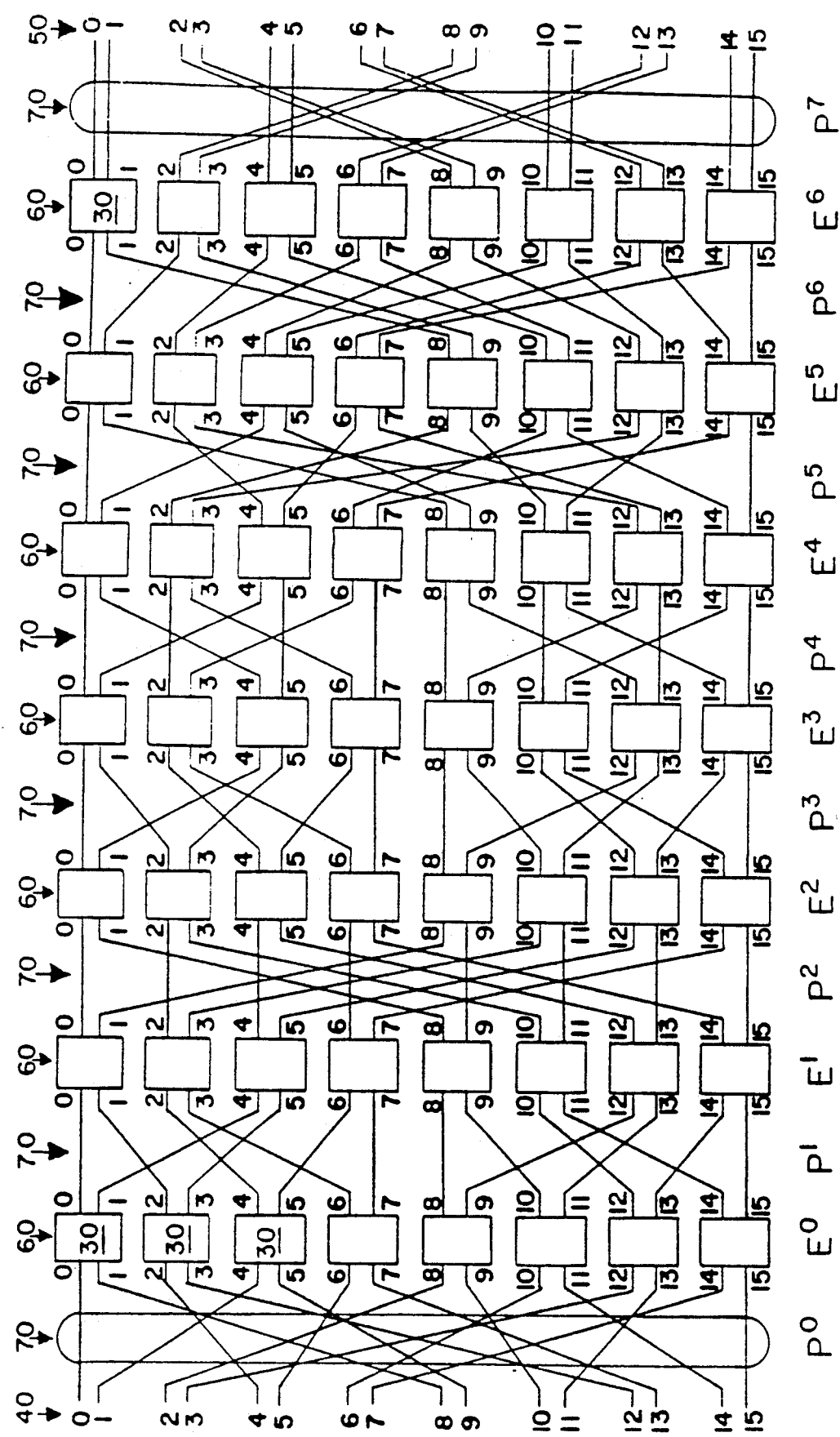
FIG. 14 2n-1 Stage Rearrangeable network

METHOD AND APPARATUS FOR SIMULATING AN INTERCONNECTION NETWORK

This is a continuation of application Ser. No. 07/414,852, filed Sep. 29, 1989, now abandoned.

BACKGROUND OF THE INVENTION

This invention concerns the simulation of an interconnection network. It effectively allows any one of a large class of networks to be conveniently and inexpensively simulated on any other one of the networks of that class. Since such networks are often used for computation, the invention also facilitates the computation of many types of problems.

One technique for increasing the performance of present day computer systems is to provide multiple, interconnected processors which all operate concurrently on the same problem. On some types of problems, such a multiprocessor system of N processors can achieve a speedup factor of nearly N over a uniprocessor system.

In a multiprocessor system, communication between processors and between processors and memory takes place via an interconnection subsystem. The interconnection subsystem may have many different forms, the least expensive of which is a time shared bus. The time shared bus, however, has relatively low bandwidth and thus becomes inadequate even for a system with a relatively small number of processors.

For greater bandwidth, an interconnection network is used instead of a time shared bus. Interconnection networks are categorized as static or dynamic. In a static network such as the ring, binary tree or hypercube, the network links are permanently fixed and links within the network cannot be connected to nodes other than the ones to which they are fixed. In contrast, a dynamic network such as the crossbar, Benes, or a member of the Banyan family of multistage interconnect networks (MINs), possesses switching elements which are active and allow the network to be reconfigured so that the network connects any input directly to any output.

The crossbar network provides the maximum bandwidth of any interconnection network. However, for systems using large numbers of processors, it is by far the most expensive and most difficult to build because the number of switching elements is directly proportional to the product of the number of inputs and the number of outputs of the network.

The Banyan family of MINs, on the other hand, is far less expensive to build because the number of switching elements required to implement such a network is directly proportional to N log (N) where N is the number of inputs to the network. However, Banyan networks can be blocked by attempts to make certain simultaneous connections of inputs to outputs, resulting in a contention of internal network communication links. This blocking condition causes some input to output connections to fail and requires that these failed connections be attempted again later.

Blocking conditions are avoided in networks such as the Benes network. Although these networks can realize all simultaneous connections between inputs and outputs, they require approximately twice the hardware of Banyan type MIN's to achieve the overall network state necessary to implement a particular connection requirement.

The Banyan family of MINs, as well as the Benes type nonblocking networks, provide practical and economical interconnection means for multiprocessor systems of any size. Both network families have good bandwidth capabilities relative to their degree of complexity and have proven effective in implementing various multiprocessor systems to date. However, the proliferation of different types of Banyan networks and the recognition that different types of such networks are especially suited for the solution of different types of problems lead to difficult choices for a designer or user in deciding which one of the many available networks to implement or acquire.

BANYAN TYPE MINs

Banyan type MINs are defined by L. R. Goke and G. J. Lipovski in "Banyan Networks for Partitioning Multiprocessor Systems," 1st Annual Symposium on Computer Architecture, pp. 21–28 (Dec. 19, 1978), as networks having a unique path between any input and any output. Examples of networks that are Banyan type MINs include the Delta family of networks (shown in FIG. 1), the Omega (FIG. 2), Baseline and Reverse Baseline networks (FIG. 3), the Indirect Binary Cube and, Cube networks (FIG. 4), the Flip network (FIG. 5) and the Modified Data Manipulator (FIG. 6). Although these networks perform differently on different types of computations, they have all been determined to be topologically equivalent multistage interconnect networks. Topological equivalence implies that for any MIN in a class of equivalent Banyan type MINs, any other MIN in this class can be obtained by appropriate renumbering and rearrangement of the inputs and outputs. For an extensive discussion of these network types and topological equivalence, see D. S. Parker, Jr., "Notes on Shuffle/Exchange-Type Switching Networks," *IEEE Trans. Comput.*, Vol. C-29, pp. 213–222 (March 1980); C. Wu and T. Y. Feng, "On a Class of Multistage Interconnection Networks," *IEEE Trans. Comput.*, Vol. C-29, pp. 694–702, (Aug. 1980); J. H. Patel, "Performance of Processor-Memory Interconnections for Multiprocessors," *IEEE Trans. Comput.*, Vol. C-30, pp. 771–780, (Oct. 1981); and H. J. Siegel, *Interconnection Networks for Large-Scale Parallel Processing*, pp. 125–150 (Lexington Books, 1985), which are incorporated herein by reference.

As is evident from FIGS. 1-6, Banyan type MINs are built in a multistage fashion using many smaller crossbar switches that are connected together via communication links. The outputs of the crossbar switches in one stage are fed via the communication links into the inputs of the crossbar switches in the next stage until an input to output path has been established.

In general, the number of network inputs need not equal the number of network outputs and the crossbar switches that are used to build the overall Banyan type MIN may be of any size. If a $\times$ b crossbar switches (i.e., switches having a inputs and b outputs) are used, the resulting Banyan type MIN will have $a^n$ network inputs and $b^n$ network outputs if n stages are used. However, as depicted in the conventional MINs illustrated in FIGS. 1-6, Banyan type MINs are commonly built using $2 \times 2$ crossbar switches 30 and commonly have the same number N of inputs 40 and outputs 50. Such a square $N \times N$ network is built with n (where $n = \log_2 N$) stage s 60 of crossbar switches 30, with each stage consisting of N/2 $2 \times 2$ crossbar switches 30. The stages are interconnected by N communication links 70 between each pair of successive stages as well as between the inputs and the first stage and between the last stage and the outputs. The links provide distinctive interconnection patterns or permutations between these elements and in conjunction with the crossbar switches establish paths or mappings between the inputs and outputs.

FIGS 1-6 depict illustrative 16×16 Delta, Omega, Baseline, Indirect Binary Cube, Flip and Modified Manipulator Networks, respectively. As will be apparent, each network has sixteen inputs 40, sixteen outputs 50 and four stages of eight 2×2 crossbar switches 30. Also represented by FIGS. 3 and 4, respectively, are the Reverse Baseline and Cube networks which are simply reversed versions of the Baseline and Indirect Binary Cube networks in which the network inputs are located in place of the outputs shown in these figures and the network outputs located in place of the inputs.

For any network of N inputs and N outputs, the number of different mappings of all N inputs each to a different output is N!. Any of these mappings can be implemented in a crossbar network. Like a crossbar network, the Banyan type MIN's are able to connect any of their inputs to any of their outputs. Unlike a crossbar network, however, pairs of the input to output paths of a Banyan type MIN share switching elements at each stage within the network and contentions will result if both paths need to use the same output from a switching element in order to reach their final destination. The Banyan type MIN in FIG. 1, for example, cannot realize the identity mapping in which input 0 is connected to output 0, input 1 is connected to output 1 and so on. Other Banyan type MIN's exhibit similar difficulties in realizing other mappings. Thus, unlike crossbar networks, an N×N Banyan type MIN cannot realize all N! possible mappings.

As a result of these differences in the ability of a MIN to realize a specific mapping, one Banyan type MIN may be better suited than another to implement a specific type of parallel processing algorithm. Consequently, in the prior art, different multiprocessor systems are customarily constructed with different interconnection networks depending on the nature of the algorithms to be run on the system. However, if an algorithm that should ideally be implemented on one network is implemented on another network, software redesign normally is required if that algorithm is to run optimally.

Hence, for reasons of flexibility, it would be very desirable for any given multiprocessor system to be able to implement many different networks so that many types of algorithms could be optimally implemented in a convenient and efficient manner. Such a system would yield maximum performance for any algorithm type without the need for algorithm or software redesign specific to the network being used in the overall multiprocessor system.

SUMMARY OF THE INVENTION

We have devised a method and apparatus for simulating on one MIN the operation of a second MIN. In accordance with our invention we generate vectors which characterize the first and second MINs. From these characteristic vectors, we generate two other vectors which are used to make the first MIN simulate the second MIN. In particular, the first of these vectors is used to reorder the inputs to the first MIN and the second of these vectors is used to reorder the outputs. As a result of this, a set of inputs to said first MIN, when reordered, is mapped by the first MIN to a set of outputs which, when reordered, simulates the operation of the second MIN.

More particularly, by means of two algorithms we generate first and second vectors, $I_1$, $O_1$, which characterize the first MIN and by means of the same two algorithms we generate third and fourth vectors, $I_2$, $O_2$, which characterize the second MIN. We then generate fifth and sixth vectors, U, V, where $U = O_2 * O_1^{-1}$ and $V = I_1^{-1} * I_2$ where $O_1^{-1}$ and $I_1^{-1}$ are the inverses, respectively, of $O_1$ and $I_1$ and * is a two-operand permutation operation which permutes elements of a first operand (e.g., $O_2$) in accordance with an order specified by a second operand (e.g., $O_1^{-1}$). The fifth vector is then used to reorder the inputs to the first MIN; and the sixth vector is used to reorder the outputs from said first MIN. As a result, inputs to the first MIN are mapped to outputs from said first MIN in accordance with the input to output mapping of the second MIN.

As will be described in more detail below, the first, second, third and fourth vectors are generated by numbering the inputs to each MIN sequentially in binary notation and recording the paths of the inputs to the outputs of the MIN in the form of a series of permutations performed on the digits of the binary notation by the connection patterns of the communication links. For the MINs of interest these permutations shift each digit of the binary notation of the input into the least significant bit position at one of the stages of the MINs. For each MIN, the order in which the binary digits are shifted into the least significant bit position determines the O vector. The I vector is determined by identifying for each bit position in the binary notation of the outputs the stage at which the bit in that position was shifted into the least significant bit position.

By using the U and V vectors to reorder its inputs, the first MIN is able to simulate the second MIN in that for the same settings of the equivalent crossbar switching elements in both MINs each of the inputs to the first MIN is routed to the same outputs to which they are routed by the second MIN. Thus, the first MIN can simply be substituted for the second MIN by connecting its inputs in place of the inputs to the second MIN, its outputs in place of the outputs from the second MIN, and its control signal inputs to the crossbar switching elements in place of the control signal inputs to the second MIN.

Moreover, in the case where routing tags rather than control signals are used to control the switching elements, the routing tags that are used to establish paths through the second MIN (i.e., the simulated network) can be used in the first MIN (i.e., the simulating network). These routing tags may be determined simply by permuting the bits of the binary address of the intended destination by the inverse of the I vector of the second MIN.

BRIEF DESCRIPTION OF DRAWING

These and other objects, features and advantages of the invention will be more readily apparent from the following detailed description of a preferred embodiment of the invention in which:

FIGS. 10a, 10b and 10c are a flowchart depicting another algorithm used in the practice of our invention.

FIG. 14 is a schematic illustration of a prior art 2n-1 stage rearrangeable interconnection network.

DETAILED DESCRIPTION OF PREFERRED EMBODIMENT OF INVENTION

Figure 1:
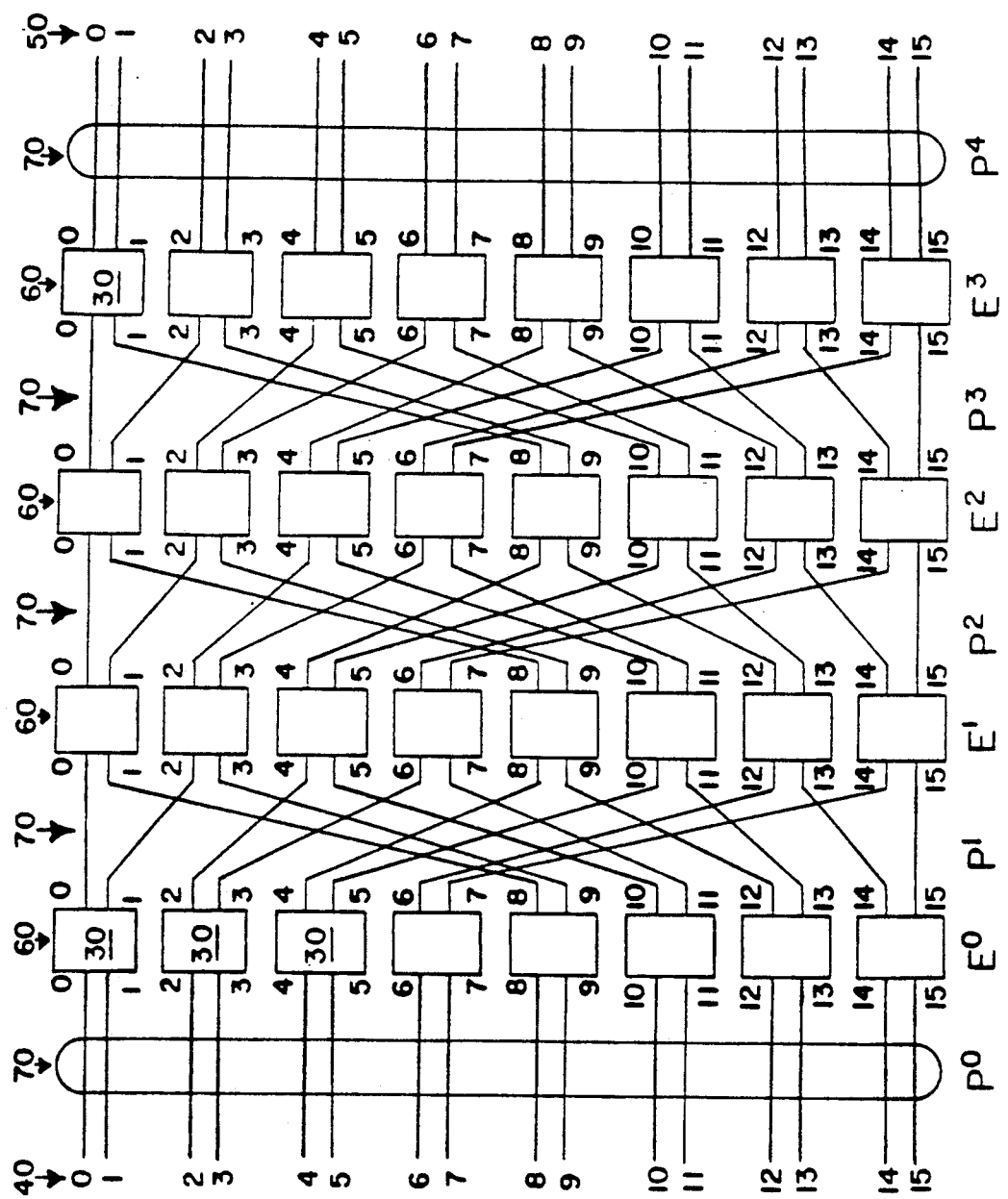
FIG. 1 is a schematic illustration of a prior art Delta interconnection network.

In describing a MIN, it is customary to identify or index the inputs and the outputs of the MIN by numbering them sequentially starting with zero. The same numbering scheme is also applied to the inputs and outputs of each stage of switching elements. As a result, the interconnection pattern established by the communication links between any two stages or between the inputs and the first stage or between the last stage and the outputs can be specified by a label having two numbers, the first of which identifies the front end of the link and the second of which identifies the distal end of the link.

In certain instances, where the relationship between the front ends and distal ends is regularly ordered, it is possible to specify this relationship by a mathematical formula. In the case of several MINs, the formula can be specified in terms of a sequence of numbers that define a permutation of the binary digits which identify the front end of each link to generate the binary digits which identify the distal end of each link. We call this sequence of numbers a permutation vector, $P^i$.

In particular, each input of the N inputs to any of the MINs shown in FIGS. 1-6 can be identified by a decimal number x having a binary equivalent value such that $$x = [x_{n-1} \ldots x_0]$$

where $$x = (2^{n-1}) x_{n-1} + \ldots + (2) x_1 + x_0.$$

As will be apparent, the number of binary digits required to identify an input is the same as the number of stages in the MIN.

Following the above-cited paper by Parker, it is possible to characterize the MINs of FIGS. 1-6 by permutations on these binary equivalent values. For example, for the perfect shuffle MIN shown in FIG. 1, the perfect shuffle permutation $\sigma$ is a circular left shift of the bits of the binary equivalent value of each input. This may be represented mathematically by $$\sigma(x) = \sigma([x_{n-1} \ldots x_0])$$
$$= [x_{n-2} \ldots x_0 x_{n-1}].$$

The unshuffle, $\sigma^{-1}$, is simply a circular right shift. Similarly, a bit reversal permutation $\rho$ is defined by $$\rho([x_{n-1} x_{n-2} \ldots x_1 x_0]) = [x_0 x_1 \ldots x_{n-2} x_{n-1}]$$

and the kth butterfly permutation $\beta_k$ which interchanges the first and kth bits of the binary index is defined by $$(\beta_k [x_{n-1} \ldots x_0]) = [x_{n-1} \ldots x_{k+1} x_0 x_{k-1} \ldots x_1 x_k].$$

Of interest to the present invention is the entire class of MINs which can be specified by permutation vectors. This class includes all the MINs of FIGS. 1-6 and many others. Further, the invention is also applicable to those MINs which can be specified by permuting the binary digits of the inputs and complementing one or more of those digits. We will refer to this entire class of MINs on which the invention may be practiced as the bit-permute-complement MINs.

In considering the routing of inputs to outputs through a MIN it is also necessary to consider the effect of the switching elements. The switching elements of a MIN have at least two operations, one of which is a pass-through that connects each input to an output that is indexed by the same number and the other of which is an exchange operation that swaps the two available outputs. Since the inputs are numbered sequentially from zero, the two inputs to a switching element have binary values that differ only in their least significant bit. Thus, the exchange operation will be seen to have the effect of complementing the least significant bit while the pass-through leaves it unchanged. We specify the switching elements of a stage that are set to effect an exchange by an exchange vector $E^i$.

By use of permutation vectors $P^i$ and exchange vectors $E^i$, it is possible to describe many MINs succinctly. Thus, each of the MINs of FIGS. 1-6 is described generally by $$\Gamma(x) = P^0 E^0 P^1 E^1 P^2 E^2 P^3 E^3 P^4 ([x_{n-1} \ldots x_0])$$

where the vectors $P^i$ and $E^i$ are applied from the left; and the perfect shuffle MIN of FIG. 1, for example, may be described more particularly by $$\Gamma_{94}(X) = \Gamma^0 E^0 \Gamma^1 E^1 \Gamma^2 E^2 \Gamma^3 E^3 \Gamma^4 ([x_{n-1} \ldots x_o]).$$

While the exchange vectors are critical in determining the routing path from an input to an output, they operate only on the value or sign of the least significant bit and do not affect the position of that bit in the set of bits provided to the switching element. For this reason, the change in the position of the digits in the binary representation of an input or output can be specified by the permutation vectors alone.

Figure 7:
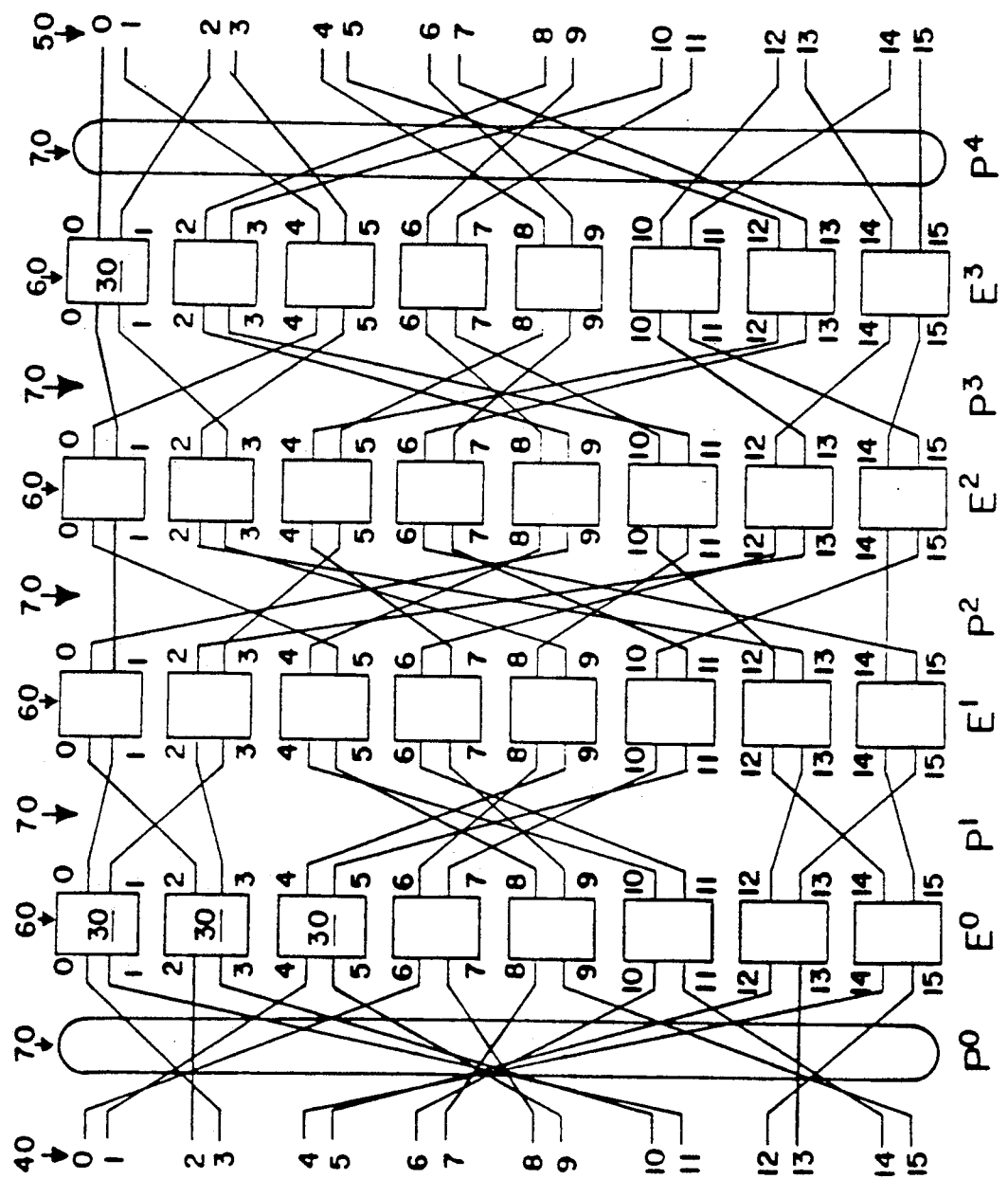
FIG. 7 is a schematic illustration of an interconnection network used in an illustrative example.

A better understanding of the operation of a set of permutation vectors may be obtained from a consideration of the bit-permute-complement network depicted in FIG. 7. The five permutation vectors that characterize the routing of the communication links of this network are $P^0 = (2, -1, -0, 3)$ $P^1 = (2, 3, 0, -1)$ $P^2 = (-0, 1, 3, -2)$ $P^3 = (2, -0, 3, 1)$ $P^4 = (1, 3, 0, 2)$ Each of these vectors specifies a permutation performed in turn on a set of binary values ($S_3$, $S_2$, $S_1$, $S_0$) which identify an input to the network. The use of a minus sign indicates that the bit in that position is complemented. Thus, in the case of the permutation vector $P^0$, this vector rearranges the binary digits $S_3$, $S_2$, $S_1$, $S_0$, which identify an input, in the order $S_2$, $S_1$, $S_0$, $S_3$, and complements the value of the $S_1$, and $S_0$ bits. The permutation vector $P^1$ then operates on the rearranged binary digits and so on.

If we apply this set of permutation vectors to an input we have the permutations set forth in Table I.

TABLE 1

| input | $S_3$, | $S_2$, | $S_1$, | $S_0$, |
|---|---|---|---|---|
| $P^0$ | 2, | $-1$, | $-0$, | 3 |
| input to stage 0 | $S_2$, | $S_1$, | $S_0$, | $S_3$, |
| $P^1$ | 2, | 3, | 0, | $-1$ |
| input to stage 1 | $S_1$, | $S_2$, | $S_3$, | $S_0$, |
| $P^2$ | $-0$, | 1, | 3, | $-2$ |
| input to stage 2 | $S_0$, | $S_3$, | $S_1$, | $S_2$, |
| $P^3$ | 2, | $-0$, | 3, | 1 |
| input to stage 3 | $S_3$, | $S_2$, | $S_0$, | $S_1$, |
| $P^4$ | 1, | 3, | 0, | 2 |
| output from $p^4$ | $S_0$, | $S_3$, | $S_1$, | $S_2$, |
| output | $d_3$, | $d_2$, | $d_1$, | $d_0$, |

Thus for the network of FIG. 7, the relationship between the inputs and outputs that is established by the communication links is such that an input specified by the binary digits $S_3$, $S_2$, $S_1$, $S_0$, is mapped or routed to an output specified by the binary digits $\bar{S}_0$, $S_3$, $\bar{S}_1$, $S_2$, where $\bar{S}_i$, is the complement of $S_i$.

In accordance with the invention, we have found that any bit-permute-complement interconnection network can be characterized by two vectors. One of these vectors is determined by the order in which the permutation vectors shift the digits of the binary notation identifying the inputs into the least significant bit position. We call this characteristic vector the O vector. The other vector is determined by the number of the stage at which each digit in the binary notation identifying the outputs was located in the least significant bit position. We call this characteristic vector the I vector.

In the example of FIG. 7 and Table 1, the right-hand column is the least significant bit position. Hence the O vector can be determined by inspection of the subscripts of the inputs to the four stages of switching elements to be ($-1$, $-2$, 0, 3) where a minus sign is used if the input was complemented. The I vector is likewise determined by inspection by identifying for each of the digits of the output the stage at which that digit was in the least significant bit position. For the example of Table 1, I is seen to be ($-1$, 0, 3, $-2$) where a minus sign is used if either the output digit is complemented or the digit was complemented when in the least significant bit position, but not if both digits were complemented.

Figure 8:
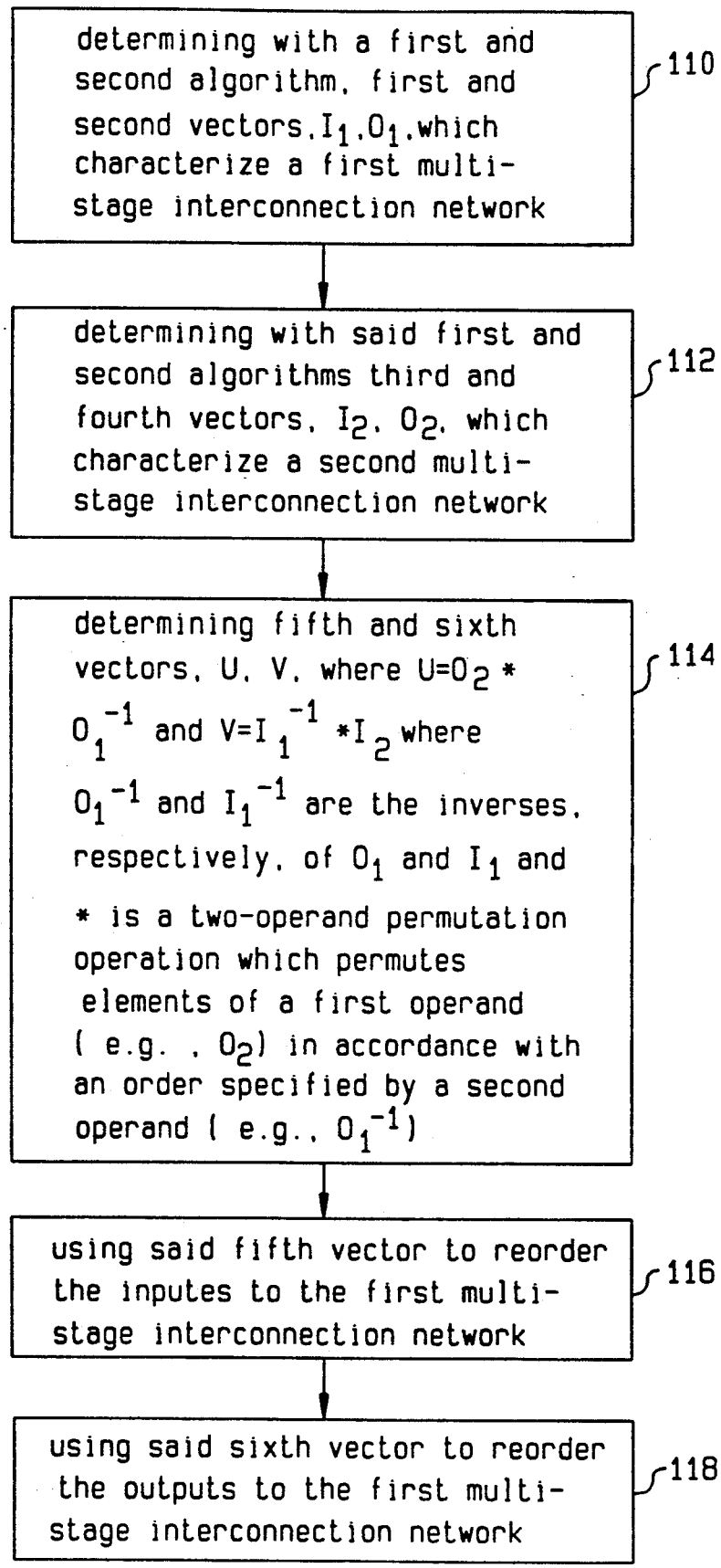
FIG. 8 is a flowchart of a preferred embodiment of the method of our invention.

Further, we have found that these vectors can be used to provide a practical simulation of one MIN by another MIN. In particular, as depicted in the flowchart of FIG. 8, we simulate a second MIN on a first MIN by determining first and second vectors, $I_1$, $O_1$, which characterize the first MIN (box 110), and third and fourth vectors $I_2$, $O_2$, which characterize the second MIN (box 112). We then determine the inverse values $O_1$ and $I_1$ of the first vectors and use these values to determine fifth and sixth vectors, U, V where $U = O_2 * O_1^{-1}$ and $V = I_1^{-1} * I_2$ where * is a two-operand permutation operation which permutes elements of a first operand (e.g., $O_2$) in accordance with an order specified by a second operand (e.g., $O_1^{-1}$) (box 114). The fifth and sixth vectors are permutation vectors which specify a reordering of the communication links in the first MIN. We use the fifth vector to reorder the inputs to the first MIN (box 116) and the sixth vector to reorder the outputs (box 118).

Figure 2:
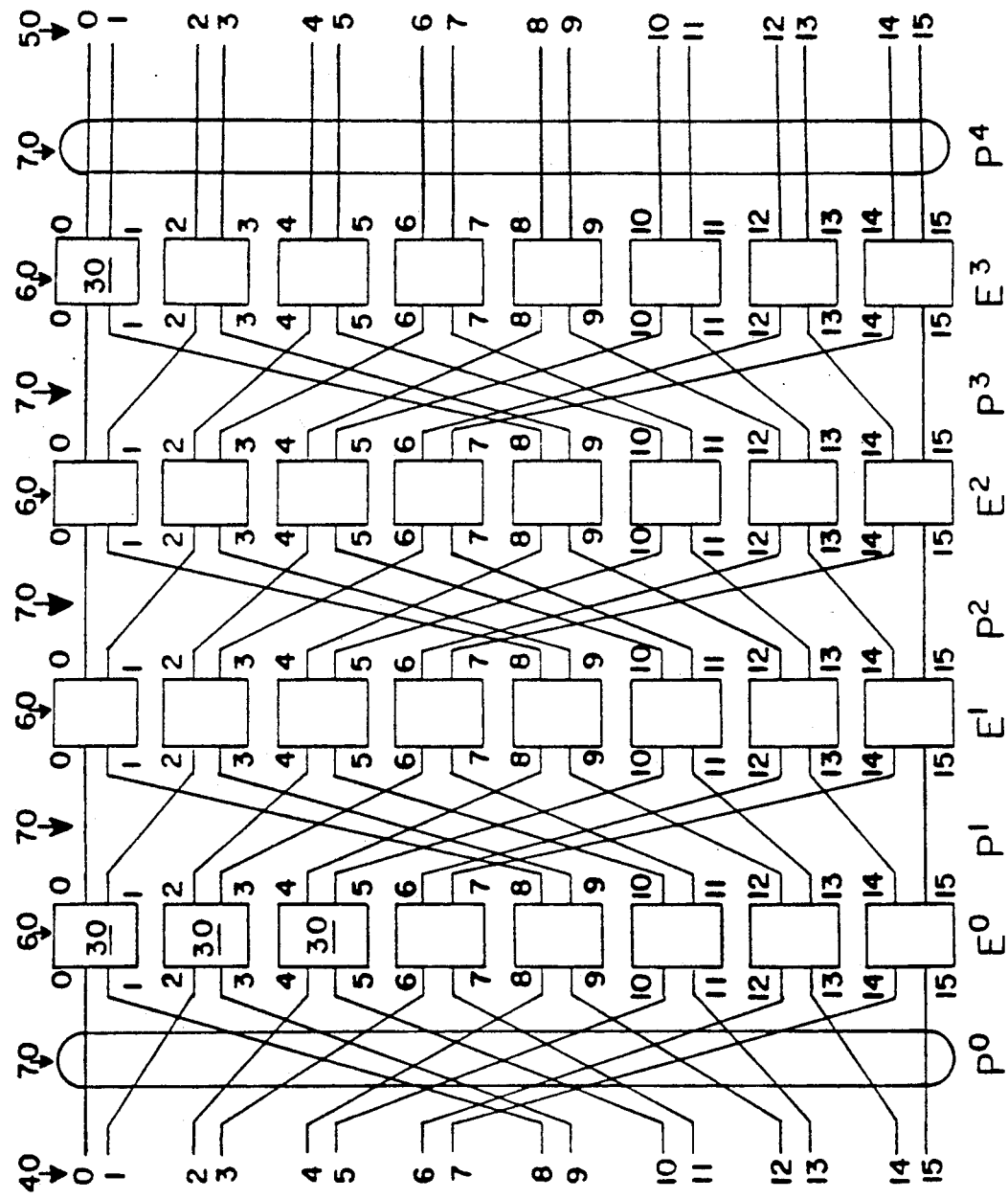
FIG. 2 is a schematic illustration of a prior art Omega interconnection network.
Figure 3:
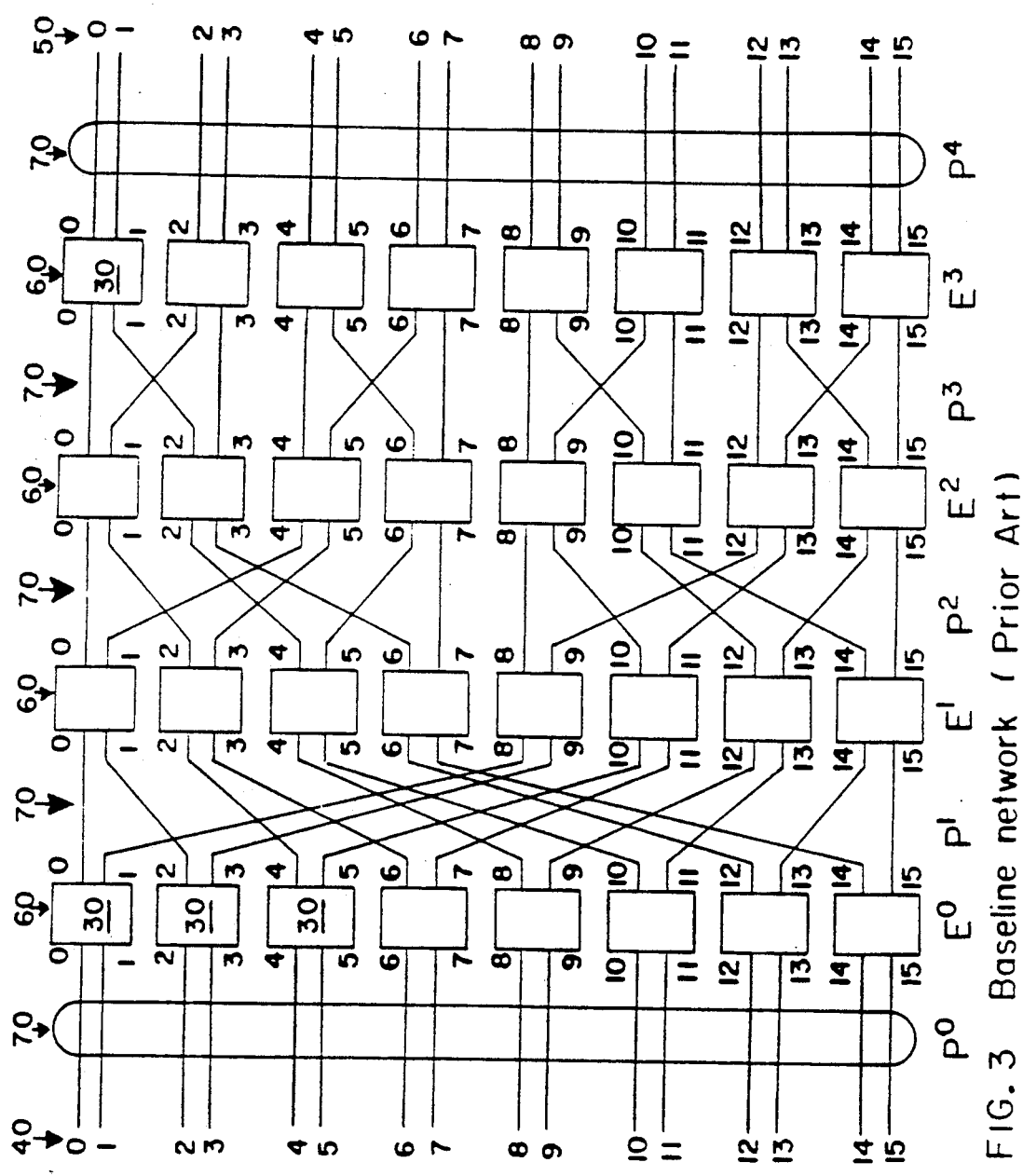
FIG. 3 is a schematic illustration of a prior art Baseline interconnection network.
Figure 4:
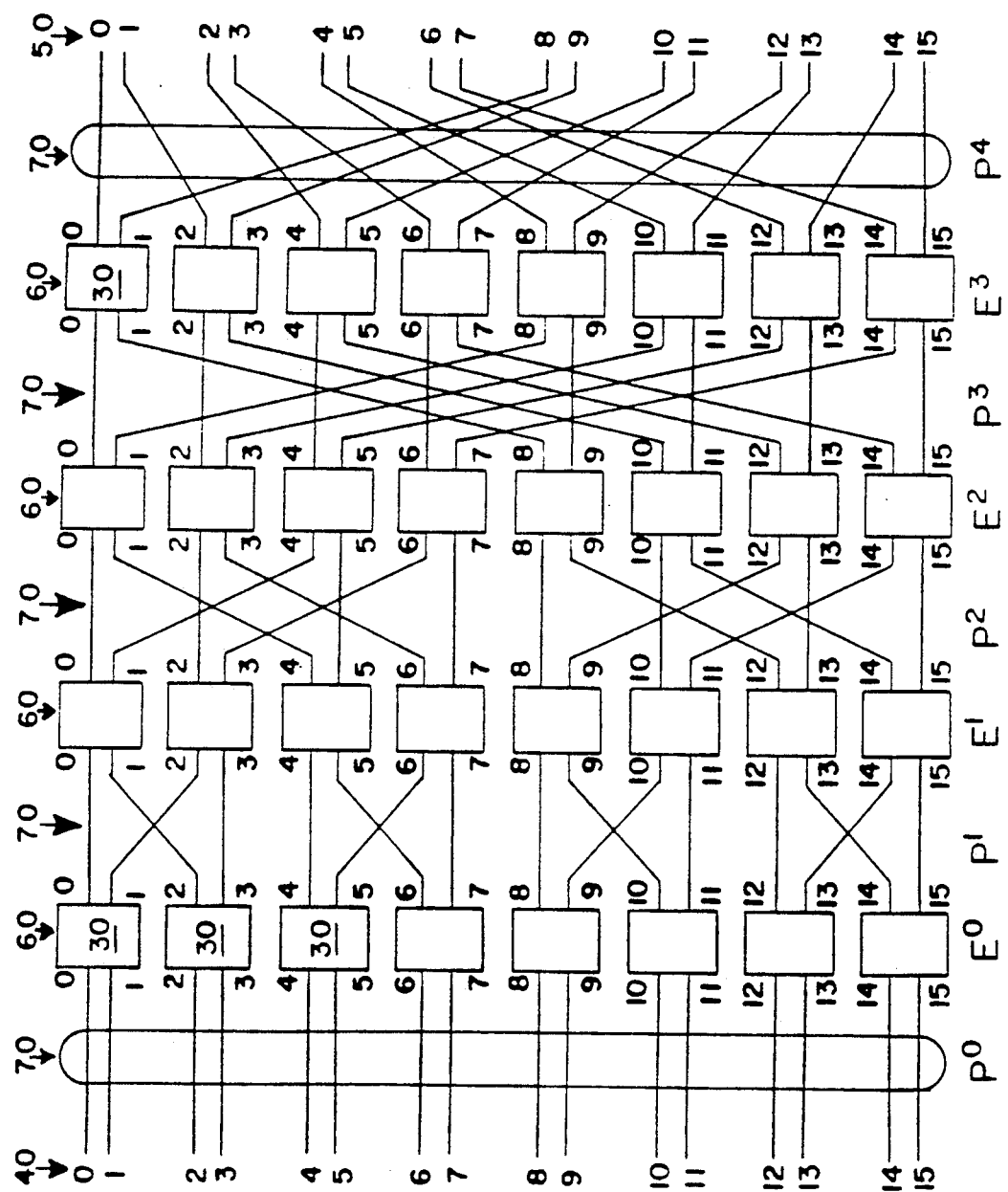
FIG. 4 is a schematic illustration of a prior art Indirect Binary Cube interconnection network.
Figure 5:
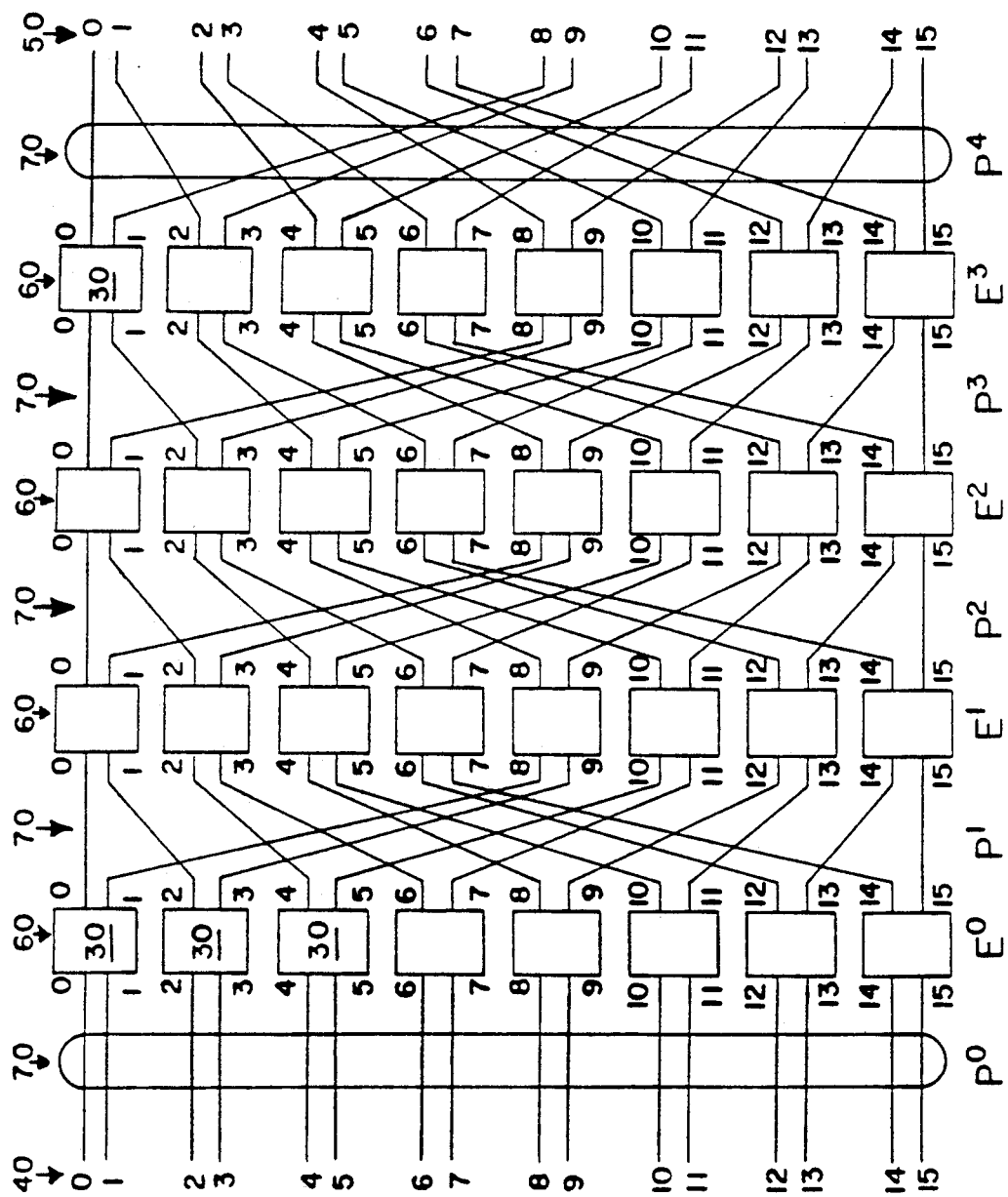
FIG. 5 is a schematic illustration of a prior art Flip interconnection network.
Figure 6:
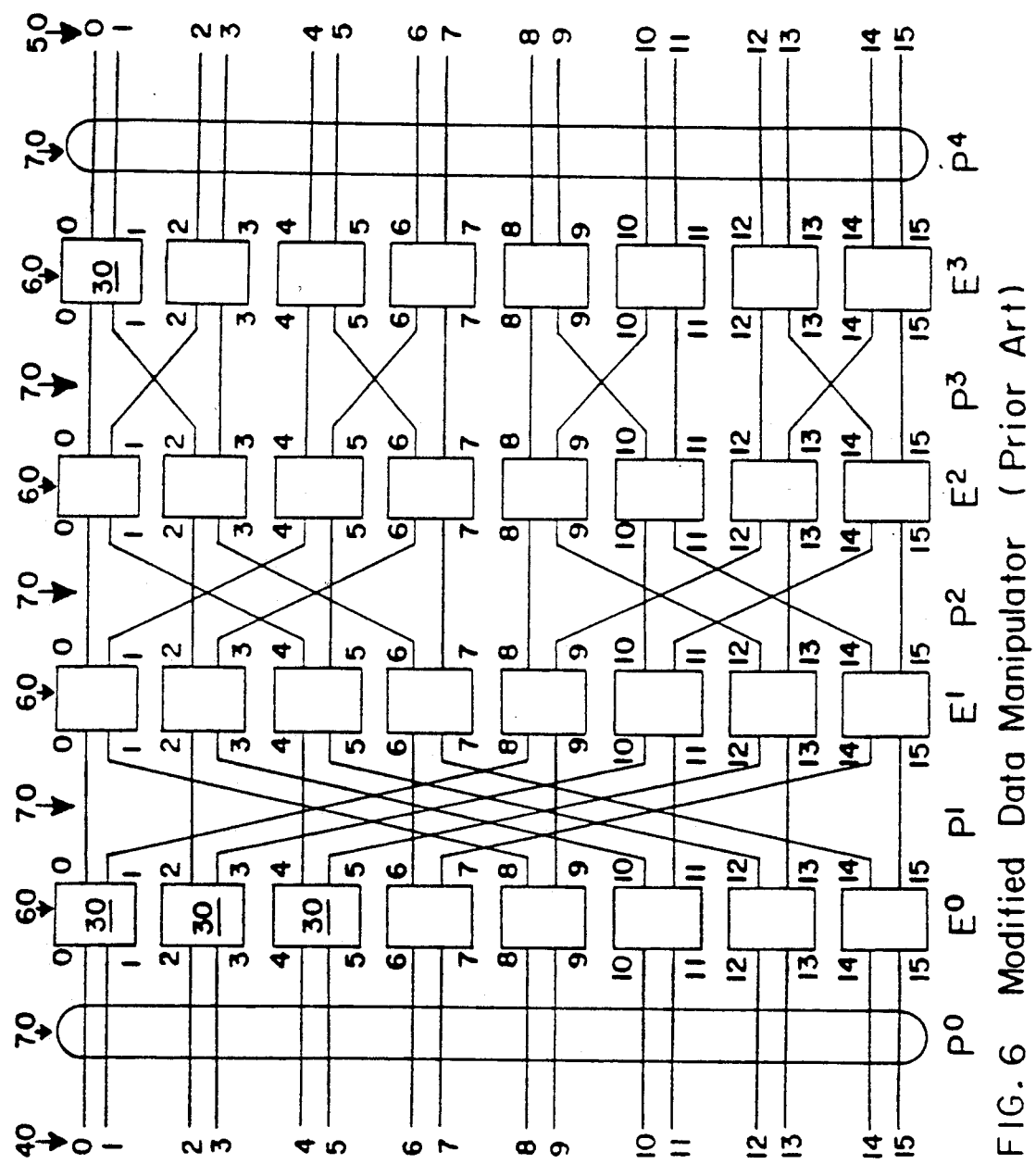
FIG. 6 is a schematic illustration of a prior art Modified Data Manipulator interconnection network.

For example, to simulate the network of FIG. 7 on an Omega network such as shown in FIG. 2, we need to compute the O and I of the Omega network. The Omega network is defined by four successive circular left shifts. Hence, the digit, $S_3$, then the digit $S_2$, then the digit, $S_1$ and finally the digit $S_0$ will be shifted into the least significant bit positions and the O vector is therefore (0 1 2 3). Four shifts of an Omega network constitute an identity operation, hence the I vector is also (0 1 2 3). For the operation * an inverse is defined such that $x * x^{-1} = (3, 2, 1, 0)$. Hence the inverse of (0 1 2 3) is also (0 1 2 3). Accordingly, to simulate the network of FIG. 7 on the Omega network of FIG. 2, we set $U = O_2 * O_1^{-1} = (-1, -2, 0, 3) * (0, 1, 2, 3) = (3, 0, -2, -1)$ and we set $V = I_1^{-1} * I_2 = (0, 1, 2, 3) * (-1, 0, 3, -2) = (-2, 3, 0, -1)$. This implementation of these permutation vectors U, V on an Omega network is shown in the network depicted in FIG. 13.

Figure 13:
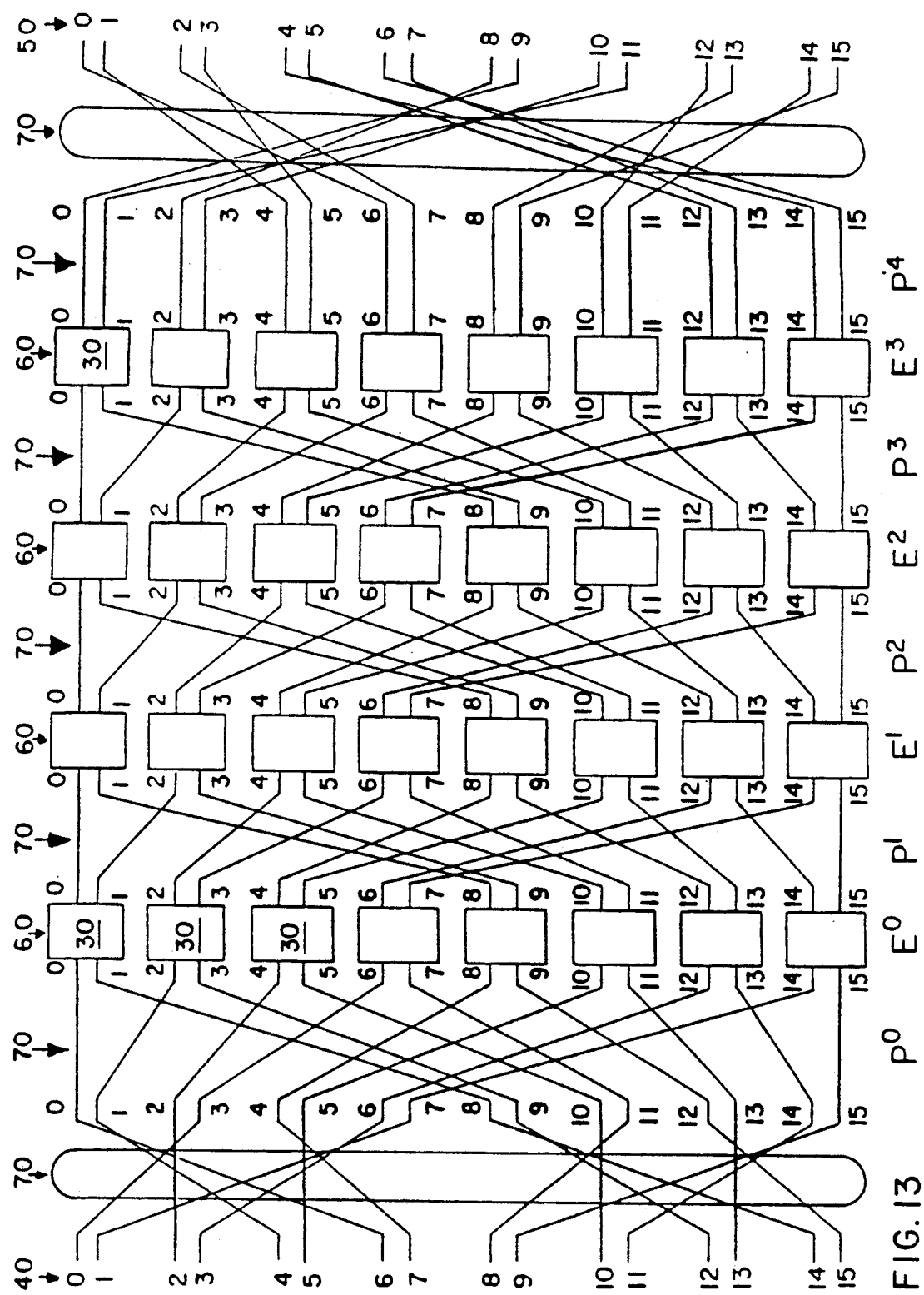
FIG. 13 is a schematic illustration of the use of the interconnection network of FIG. 11 to simulate another interconnection network.

It can be shown that each input to the networks of FIGS. 7 and 13 will be routed by those networks to the same outputs as long as the settings of the equivalent switching elements are the same. Hence, the network of FIG. 13 can be substituted for that of FIG. 7 and can be regarded as a simulation of that network.

In some networks, the switching elements are controlled by tags which are routed through the network as part of a message instead of by control signals applied externally to the switching elements. In this case, a tag from the simulated network is used to route a message through the simulating network. In particular, for an Omega network, the tag is ordinarily the binary address of the destination. In accordance with the invention, the tab is obtained when the address bits are permuted in accordance with the vector specified by $I^{-1}$ of the network being simulated.

Figure 9:
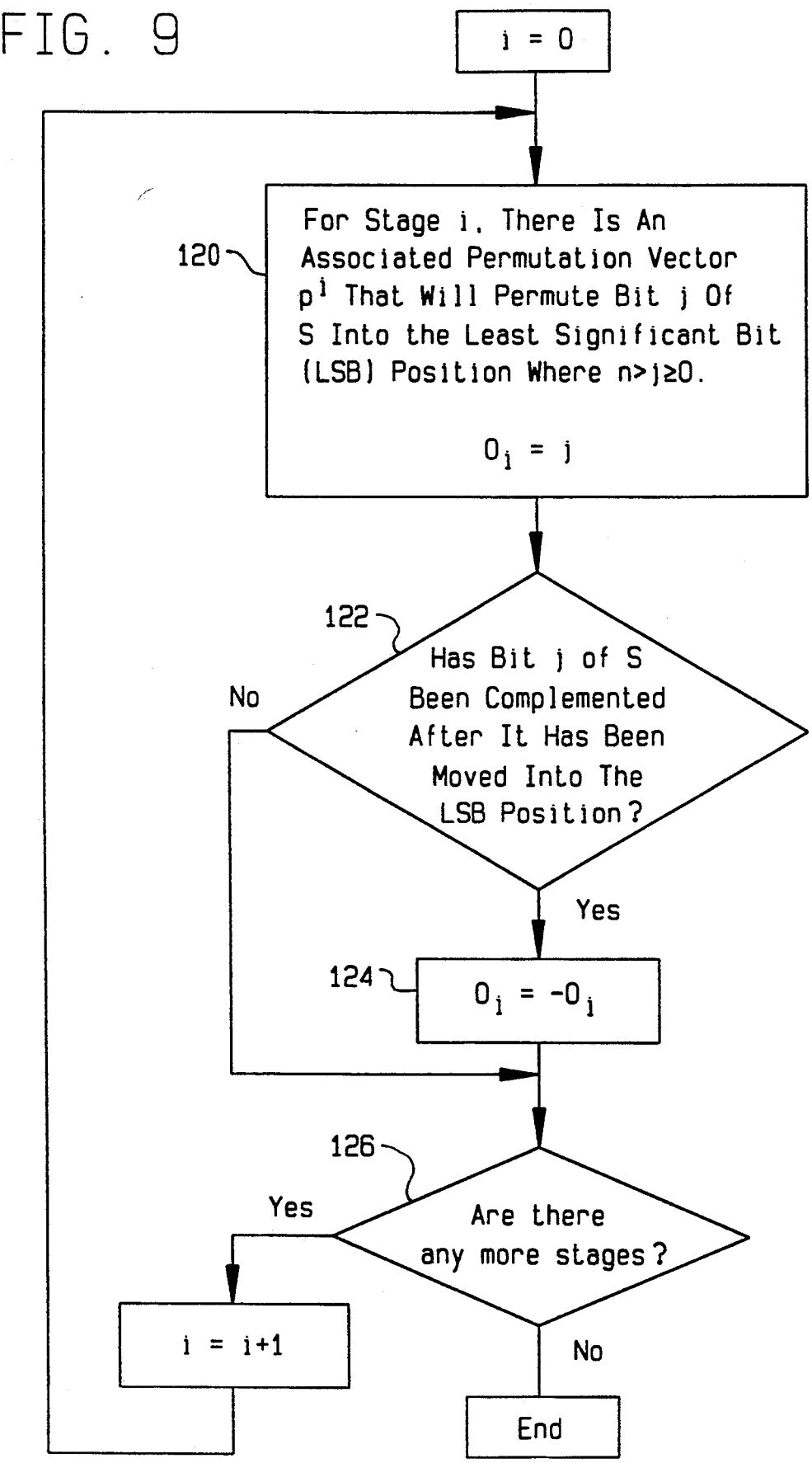
FIG. 9 is a flowchart depicting an algorithm used in the practice of our invention.
Figure 10A:
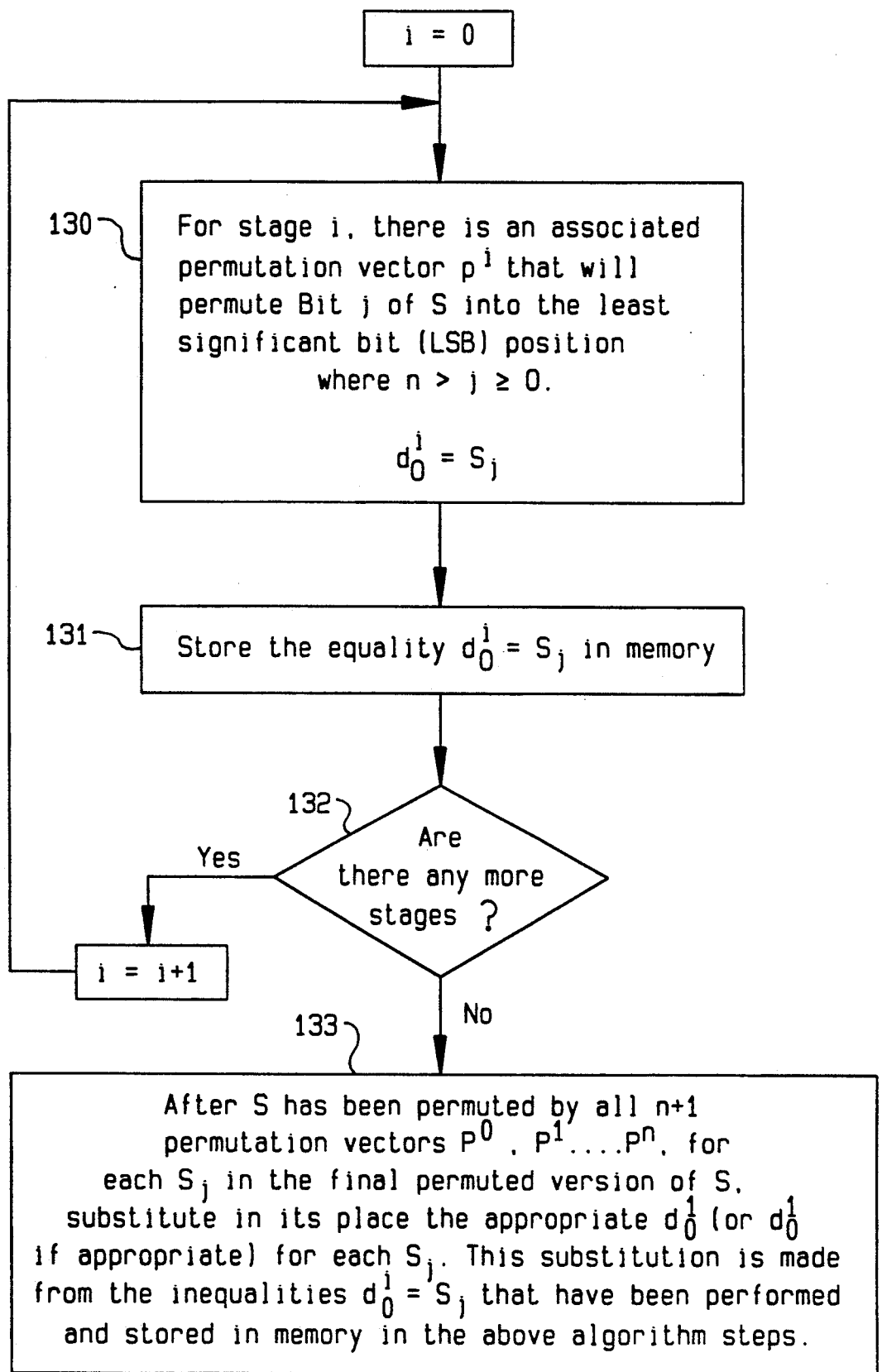
Figure 10C:
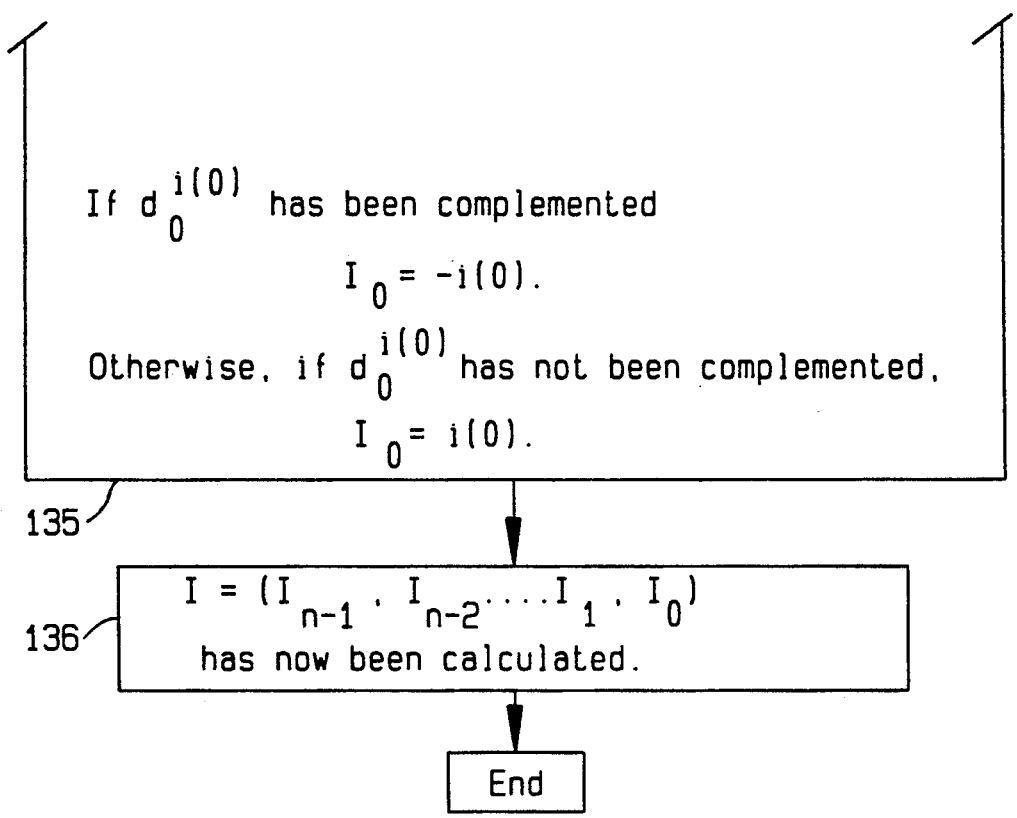

Details of an algorithm to calculate the O vector are set forth in FIG. 9 and details of an algorithm to calculate the I vector are set forth in FIGS. 10a, 10b and 10c. FIG. 9 depicts a flowchart of the algorithm to calculate the characteristic vector O. The following defines the terms used in the flow chart: For an n-stage network, O is a vector containing n elements ($O_{n-1}$, $O_{n-2}$, ... $O_1$, $O_0$); the leftmost stage of the network is defined to be stage O; the network's inputs are represented by an n digit binary number $S = (S_{n-1}, S_{n-2} \ldots S_1, S_0)$. The algorithm requires that the binary digits representing the network input be sequentially permuted by each of the first n permutation vectors $P^i$ (Box 120, 126). For example in the four stage network in FIG. 1, the binary bits representing the input would be permuted by each of $P^0$, $P^1$, $P^2$ and $P^3$.

For each of these n permutations, one unique bit of the binary digits representing the input to that particular stage is shifted into the least significant bit (LSB) position. The order in which this occurs determines the O vector. For example, if bit n−1 of the binary digits representing the input is shifted into the LSB position by stage 0 of the network (i.e., by $P^0$) then $O_0=n-1$. When ($O_{n-1}, O_{n-2} \ldots O_1, O_0$) have each been determined, the characteristic vector O has been calculated. If a binary digit is complemented after it is shifted into the LSB position, the appropriate component of the O vector is defined to be negative (box 122, 124).

FIGS. 10a, 10b and 10c depict a flowchart of the algorithm to calculate the characteristic vector I. The following defines the terms used in the flow chart: For an n-stage network, I is a vector containing n elements ($I_{n-1}, I_{n-2}, \ldots I_1, I_0$); the leftmost stage of the network is defined to be stage 0; the network's inputs are represented by an n-digit binary number $S=(S_{n-1}, S_{n-2}, \ldots S_1, S_0)$; the network's outputs are represented by an n-digit binary number $D=(D_{n-1}, D_{n-2}, \ldots D_1, D_0)$. The algorithm requires that the binary digits representing the network input be sequentially permuted by each of the n+1 permutation vectors $P^i$ (box 130, 132). For each of the first n permutations, one unique bit of the binary digits representing the input to that particular stage is shifted into the LSB position. After the binary digits have been permuted by all of the n+1 permutation vectors $P^i$, the resulting binary number represents the output of the overall network. This output is defined to be $D=(d_{n-1}, d_{n-2} \ldots d_1, d_0)$ (box 133, 134).

The I vector is determined by identifying for each of the n bit positions in the binary representation of the network output the stage at which the bit in that position was shifted into the LSB position (box 131, 135). If the binary digit of the output has been complemented subsequent to having been shifted into the LSB position, the corresponding component of the I vector is defined to be negative (box 135).

When, for all n bit positions in the binary representation of the network output, the stage at which that bit was shifted into the LSB position has been determined, the entire I vector has been computed (box 136).

Figure 11:
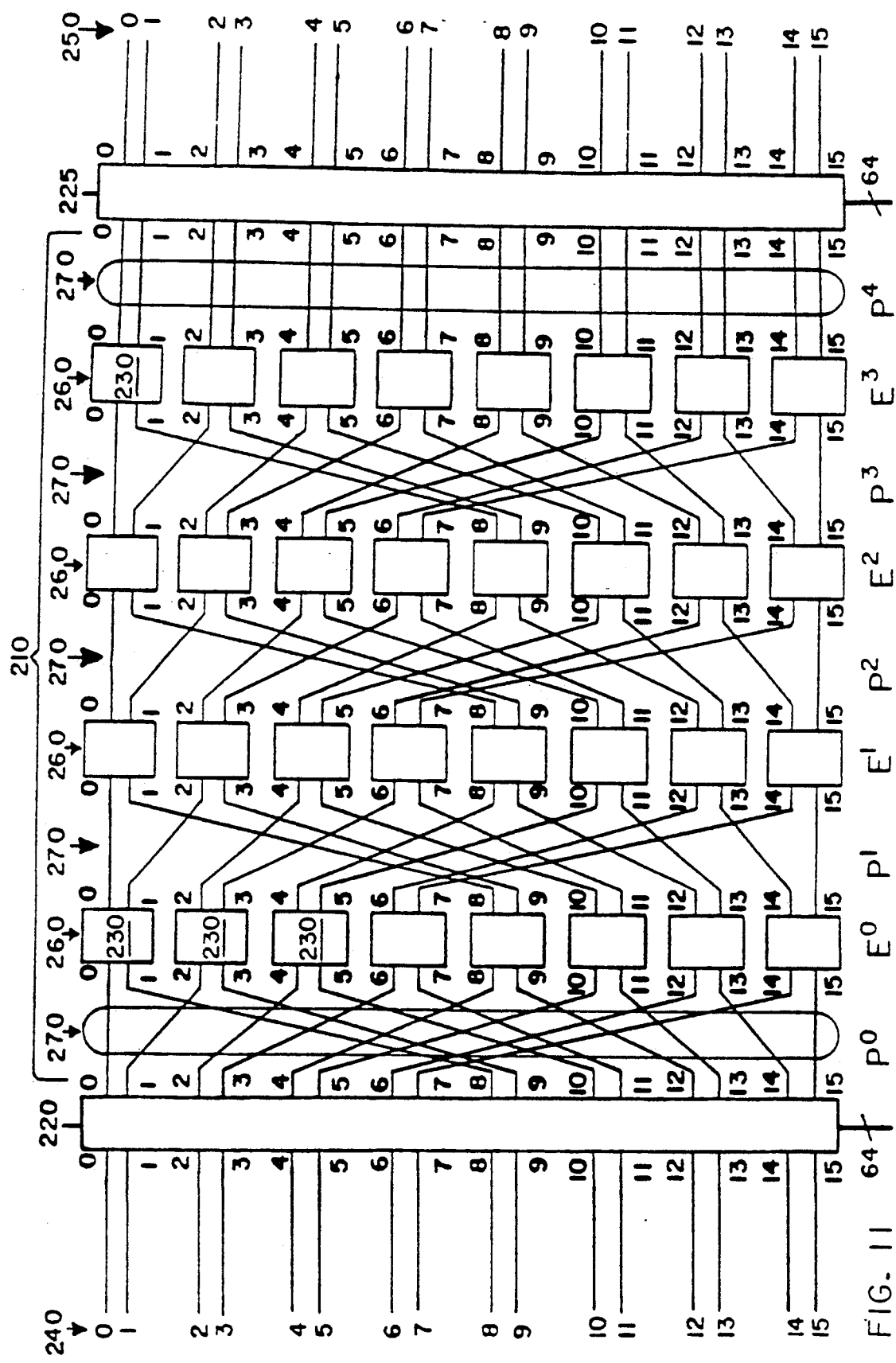
FIG. 11 is a schematic illustration of a preferred embodiment of a multi-stage interconnection network of our invention.
Figure 12:
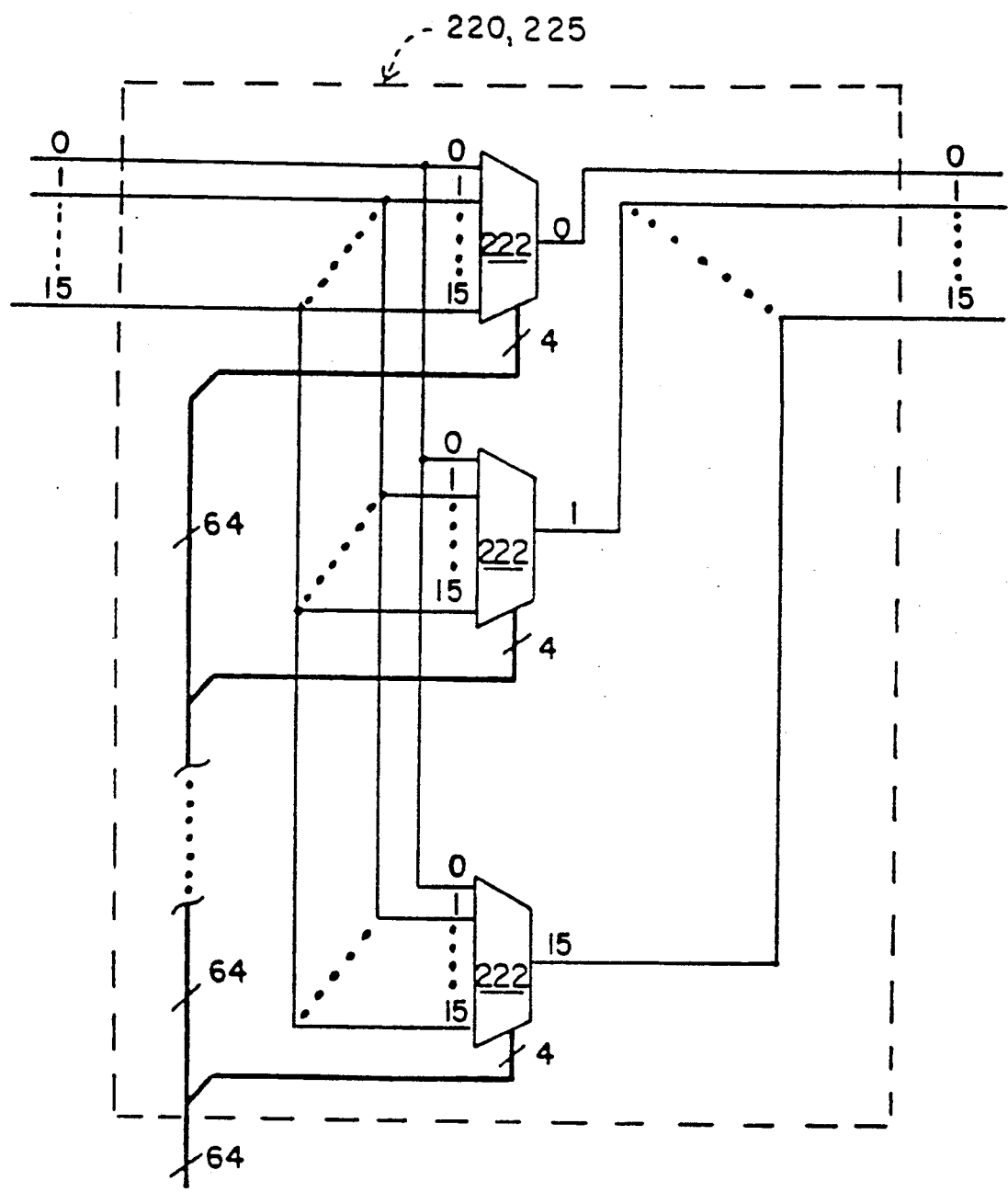
FIG. 12 is a schematic illustration of a preferred embodiment of certain elements of the MIN of FIG. 11.

Illustrative apparatus for implementing the invention is shown in FIGS. 11 and 12. As depicted in FIG. 11, the apparatus comprises a MIN 210, illustratively a perfect shuffle or Omega network, an input permutation matrix 220, and an output permutation matrix 225. Switching elements 230, inputs 240, outputs 250, stages 260 of MIN 210 and communication links 270 are the same as those of any one of the networks depicted in FIGS. 1–6 and bear the same numbers incremented by 200. The input permutation matrix and the output permutation matrix advantageously are of identical construction. Each matrix has the capability of connecting any one of its inputs to any one of its outputs. The input matrix implements the fifth vector U and the output matrix implements the sixth vector V.

Illustratively, as shown in FIG. 12, each permutation matrix 220, 225, comprises an array of multiplexers 222, one for each output from the matrix. Each multiplexer has inputs from every one of the inputs to the matrix and a single output to a different one of the outputs of the matrix. Thus, for the specific embodiment shown in FIGS. 11 and 12, each matrix comprises sixteen sixteen-to-one multiplexers 222. Each of the sixteen multiplexers has sixteen inputs from each of the inputs to the matrix and a single output to a different one of the outputs of the matrix. One of the inputs of each of the multiplexers is selected for connection to the multiplexer output by means of four control lines. The signals on the four control lines to each of the sixteen multiplexers are generated by control logic (not shown) which computes for the vector U or V, as the case may be, which input is to be connected to which output and generates the control signals which cause the multiplexer connected to that output to select the appropriate input.

As will be apparent to those skilled in the art, numerous alternatives may be employed in the practice of the invention. Other ways may be found to determine the O and I vectors and to calculate the U and V vectors.

The techniques herein may also be practiced on other types of networks such as the (2n−1) stage rearrangeable interconnection networks. These networks may be regarded as two back-to-back n stage networks in which one stage is shared in common. Characteristic vectors O and I may be defined for each of these two back-to-back networks following the techniques set forth above. Of particular interest, it can be determined that the (2n−1) stage interconnection network is rearrangeable if for the I vector of the input side of the two back-to-back networks and the O vector of the output side of the two networks I * O=[0, 1, . . . n−1].

What is claimed is:

1. In a first multi-stage interconnection network having a plurality of inputs, a plurality of outputs, a plurality of stages of switching elements and a plurality of communication links between successive stages, said first multi-stage interconnection network having a first mapping between its inputs and its outputs, a method of simulating a second multi-stage interconnection network having a second mapping between its inputs and its outputs comprising the steps of:

determining from the first multi-stage interconnection network with first and second algorithms first and second vectors, $I_1$, $O_1$, which numerically characterize the first mapping between the inputs and outputs of said first multi-stage interconnection network;

determining from the second multi-stage interconnection network with said first and second algorithms third and fourth vectors, $I_2$, $O_2$, which numerically characterize the second mapping between the inputs and outputs of said second multi-stage interconnection network;

determining fifth and sixth vectors, U, V, where $U=O_2 * O_1^{-1}$ and $V=I_1^{-1} * I_2$ where $O_1^{-1}$ and $I_1^{-1}$ are the inverses, respectively, of $O_1$ and $I_1$ and * is a two-operand permutation operation which permutes elements of a first operand (e.g., $O_2$) in accordance with an order specified by a second operand (e.g., $O_1^{-1}$);

using said fifth vector to recorder the plurality of inputs to the first multi-stage interconnection network by applying said plurality of inputs to a like plurality of inputs to a first switching means having a like plurality of outputs which are connected to a like plurality of inputs to a first stage of the first multi-stage interconnection network and connecting said inputs to the first switching means to the outputs of the first switching means in an order determined by said fifth vector; and using said sixth vector to reenter the plurality of outputs from said first multi-stage interconnection network by applying said plurality of outputs from said multi-stage interconnection network to a like plurality of inputs to a second switching means having a like plurality of outputs and connecting said inputs to the second switching means to the outputs of the second switching means in an order determined by said sixth vector, whereby inputs to said first switching means are mapped to outputs from said second switching means in accordance with said second mapping of said second interconnection network.

2. The method of claim 1 wherein:

the inputs and outputs of each interconnection network are numbered sequentially in binary notation;

the mapping between the inputs and outputs of each interconnection network is a series of permutations performed successively on the digits of the binary notation identifying the inputs, said permutations specifying interconnection patterns established by the communication links between successive stages of the network and between the inputs and a first stage and between a last stage and the outputs;

the permutations shift each digit of the binary notation identifying the inputs into the least significant bit position at one of the stages of the multi-stage interconnection network;

the order in which the binary digits are shifted into the least significant bit position in the first multi-stage network determines the $O_1$ vector; and the order in which the binary digits are shifted into the least significant bit position in the second multi-stage network determines the $O_2$ vector.

3. The method of claim 2 wherein there are n stages of switching elements numbered from a stage 0 to a stage $n-1$ and each O vector is equal to $k_{n-1}, k_{n-2}, \ldots, k_1, k_0$ where $k_0$ is the binary digit that is shifted into the least significant bit position at stage 0, $k_1$ is the binary digit that is shifted into the least significant bit position at stage 1, and so on.

4. The method of claim 1 wherein:

the inputs and outputs of each interconnection network are numbered sequentially in binary notation;

the mapping between the inputs and outputs of each interconnection network is a series of permutations performed successively on the digits of the binary notation identifying the inputs, said permutations specifying interconnection patterns established by the communication links between successive stages of the network and between the inputs and a first stage and between a last stage and the outputs;

the permutations shift each digit of the binary notation identifying the inputs into the least significant bit position at one of the stages of the multi-stage interconnection network;

there are n stages of switching elements numbered from a stage 0 to a stage $n-1$, for each bit position in the binary notation identifying the outputs of the first multistage network, the number of the stage at which the bit in that position was shifted into the least significant bit position determines the $I_1$ vector, and for each bit position in the binary notation identifying the outputs of the second multistage network, the number of the stage at which the bit in that position was shifted into the least significant bit position determines the $I_2$ vector.

5. The method of claim 4 wherein the outputs of each network are specified by the binary values $d_{n-1}, d_{n-2}, \ldots d_1, d_0$, and each I vector is equal to $I_{n-1}, I_{n-2}, \ldots I_1, I_0$, where $I_0$ is the number of the stage at which the $d_0$ digit was shifted into the least significant bit position, $I_1$ is the number of the stage at which the $d_1$ digit was shifted into the least significant bit position, and so on.

6. In a first multi-stage interconnection network having N inputs, N outputs and n stages of $2 \times 2$ switches where $n = \log_2 N$ and there are $N/2$ $2 \times 2$ switches in each stage, said first multi-stage interconnection network having a first mapping between its inputs and its outputs, a method of simulating a second multi-stage interconnection network having a second mapping between its inputs and its outputs comprising the steps of:

determining from the first multi-stage interconnection network with first and second algorithms first and second vectors, $I_1$, $O_1$, which numerically characterize the first mapping between the inputs and outputs of said first multi-stage interconnection network;

determining from the second multi-stage interconnection network with said first and second algorithms third and fourth vectors, $I_2$, $O_2$, which numerically characterize the second mapping between the inputs and outputs of said second multi-stage interconnection network;

determining fifth and sixth vectors, U, V, where $U = O_2 * O_1^{-1}$ and $V = I_1^{-1} * I_2$ where $O_1^{-1}$ and $I_1^{-1}$ are the inverses, respectively, of $O_1$ and $I_1$ and * is a two-operand permutation operation which permutes elements of a first operand (e.g., $O_2$) in accordance with an order specified by a second operand (e.g., $O_1^{-1}$);

using said fifth vector to recorder the N inputs to the first multi-stage interconnection network by applying said N inputs to N inputs to a first switching means having N outputs which are connected to N inputs to a first stage of the first multi-stage interconnection network and connecting said N inputs to the first switching means to the N outputs of the first switching means in an order determined by said fifth vector; and using said sixth vector to recorder the outputs from said first multi-stage interconnection network by applying said N outputs from said multi-stage interconnection network to N inputs to a second switching means having N outputs and connecting said N inputs to the second switching means to the N outputs of the second switching means in an order determined by said sixth vector, whereby inputs to said first switching means are mapped to outputs from said second switching means in accordance with said second mapping of said second interconnection network.

7. The method of claim 6 wherein:

the inputs and outputs of each interconnection network are numbered sequentially in binary notation;

the mapping between the inputs and outputs of each interconnection network is a series of permutations performed successively on the digits of the binary notation identifying the inputs, said permutations specifying interconnection patterns established by the communication links between successive stages of the network and between the inputs and a first stage and between a last stage and the outputs;

the permutations shift each digit of the binary notation identifying the inputs into the least significant bit position at one of the stages of the multi-stage interconnection network;

the order in which the binary digits are shifted into the least significant bit position in the first multi-stage network determines the $O_1$ vector; and the order in which the binary digits are shifted into the least significant bit position in the second multi-stage network determines the $O_2$ vector.

8. The method of claim 7 wherein the n stages of switching elements are numbered from a stage 0 to a stage n−1 and each O vector is equal to $k_{n-1}, k_{n-2}, \ldots, k_1, k_0$ where $k_0$ is the binary digit that is shifted into the least significant bit position at stage 0, $k_1$ is the binary digit that is shifted into the least significant bit position at stage 1, and so on.

9. The method of claim 6 wherein:
the inputs and outputs of each interconnection network are numbered sequentially in binary notation;
the mapping between the inputs and outputs of each interconnection network is a series of permutations performed successively on the digits of the binary notation identifying the inputs, said permutations specifying interconnection patterns established by the communication links between successive stages of the network and between the inputs and a first stage and between a last stage and the outputs;
the permutations shift each digit of the binary notation identifying the inputs into the least significant bit position at one of the stages of the multi-stage interconnection network;
the n stages of switching elements are numbered from a stage 0 to a stage n−1,
for each bit position in the binary notation identifying the outputs of the first multistage network, the shifted into the least significant bit position determines the $I_1$ vector, and
for each bit position in the binary notation identifying the outputs of the second multistage network, the number of the stage at which the bit in that position was shifted into the least significant bit position determined the $I_2$ vector.

10. The method of claim 9 wherein the outputs of each network are specified by the binary values $d_{n-1}, d_{n-2}, \ldots d_1, d_0$, and each I vector is equal to $I_{n-1}, I_{n-2}, \ldots I_1, I_0$, where $I_0$ is the number of the stage at which the $d_0$ digit was shifted into the least significant bit position, $I_1$ is the number of the stage at which the $d_1$ digit was shifted into the least significant bit position, and so on.

* * * * *